United States Patent Office 3,427,382
Patented Feb. 11, 1969

3,427,382
GEL HAIRDRESSING COMPOSITION
John W. Haefele, Mount Healthy, Ohio, assignor to The Procter & Gamble Company, Cincinnati, Ohio, a corporation of Ohio
No Drawing. Filed June 7, 1965, Ser. No. 462,065
U.S. Cl. 424—71    4 Claims
Int. Cl. A61k 7/10

ABSTRACT OF THE DISCLOSURE

A gel hairdressing composition comprising a high molecular weight carboxyvinyl polymer, a hydroxypropoxyl-substituted methylcellulose ether, an alcohol and water, the composition being adjusted to a pH range of from about 6 to 8 with a basic amine.

---

This invention relates to a hairdressing composition in gel form. More particularly, it relates to a hairdressing composition containing a novel combination of gelling agents.

Hairdressing compositions in gel form have become increasingly popular because of their attractive appearance and adaptability to packaging in clear plastic tubes. The high level of hair control attainable using certain of these gelled formulations is also a feature which has contributed to the wide acceptance of such products.

Gelled hairdressings typically contain a "thickening" or "gelling" agent such as substituted methylcellulose ethers and one or more hair grooming agents. Although the thickening agents heretofore employed may produce a gel having desired physical properties, such products often leave a gummy or stiff film on the hair after drying. Other thickening agents yield products which have poor stability on aging.

Thus, gelled hairdressings prepared in accordance with the teachings of the art are unsatisfactory from one or more standpoints.

The thickening or gelling agents employed in a hairdressing should desirably yield a rigid "standup" gel and at the same time provide a measure of hair control without leaving a sticky or stiff film on the hair. Further, the resulting product should be stable on aging and should have a low yield strength to allow the gel to be broken down to a thin liquid quickly on the hands.

It is therefore an object of this invention to provide improved hairdressings in gelled form.

It is a further object of this invention to provide a hairdressing in a rigid standup gel form, which improves hair manageability without leaving a sticky or stiff film on the hair on drying.

It is a further object to provide a stable gelled hairdressing having a low yield strength and which reverts to a thin liquid when placed on the hands prior to application to the hair.

These and other objects will become apparent from the following more detailed description of this invention.

It has now been found that a hairdressing composition can be prepared which possesses all of these desired performance and physical properties, by use of a novel combination of thickening agents.

In general terms, hairdressings in accordance with this invention comprise a water-alcohol base gelled with a mixture of a high molecular weight carboxyvinyl polymer and hydroxypropyl methylcellulose ethers, the composition being neutralized with an alkaline material such as triethylamine, isopropylamine, diisopropylamine, and morpholine.

Preferred compositions in accordance with this invention also include a hair grooming agent of the polyol class, such as the water-soluble lower alkoxy polyoxyalkylene glycols or polyoxyalkylene diols.

As hereinbefore indicated, the hairdressing compositions of this invention are characterized by their content of a unique combination of thickening agents. The high molecular weight carboxyvinyl polymer which constitutes one component of this combination can be described as a water-soluble polymer of acrylic acid cross-linked with about 1% of a polyallyl ether of sucrose having an average of about 5.8 allyl groups for each sucrose molecule. These polymers have molecular weights in the order of magnitude of 1,000,000. Such polymers are available from the B. F. Goodrich Chemical Company and are sold under the trademark "Carbopol 934." Similarly constituted products are designated "Carbopol 940" and "Carbopol 941."

Carbopol 934 produces thick formulations such as heavy gels, emulsions and suspensions. It gives permanent stability at high viscosity. Carbopol 940 forms clear water or water alcohol gels. It has excellent thickening efficiency at high viscosities. Carbopol 941 provides permanent emulsions at relatively low viscosities in ionic systems. It does not provide as much viscosity at high concentrations as do Carbopol 934 and 940, but it produces appreciable viscosities at extremely low concentrations.

Other physical and chemical properties of these materials are disclosed in the B. F. Goodrich Chemical Company Service Bulletin, "Carbopol Water-Soluble Resins," GC-36. This component comprises from about 0.1% to about 1.0% by weight of the hairdressing compositions of this invention. Preferably, this component is used in such compositions in a concentration of from about 0.5% to about .75%.

The second component of the thickening combination employed in the compositions of the present invention are described as hydroxypropoxyl-substituted methylcellulose ethers. These polymeric ethers contain varying ratios of hydroxypropoxyl to methoxyl substituents on the repeating anhydroglucose units which comprise the polymeric backbone of the cellulose structure. Polymers of this class which are suitable for use in the present invention contain from about 19% to about 30% by weight of methoxyl substituents and from about 3% to 12% by weight of hydroxypropoxyl substituents on the anhydroglucose units. The number of substituent groups on the three available positions of the anhydroglucose units, i.e., "degree of substitution," is important in determining solubility properties of these polymers. If all three available positions on each unit are substituted, the "degree of substitution" is designated as three; if an average of two on each ring are substituted the "degree of substitution" is designated as two, etc. The degree of substitution with methoxyl and hydroxypropoxyl groups can vary from about 1.08 to 1.82 and from about .07 to 0.3, respectively. The molecular weight of these polymers range from about 100,000 to about 175,000. These products are commercially available from the Dow Chemical Company and are sold under the trade names "Methocel 60–HG," "Methocel 65–HG," "Methocel 70–HG," and "Methocel 90–HG." For the purpose of this invention, Methocel 60–HG is preferred.

Methocel 60–HG is comprised of from 28% to 30% by weight of methoxyl substituents and from 7% to 12% by weight of hydroxypropoxyl substituents. The degree of substitution with methoxy and hydroxypropoxyl substituents is from 1.68 to 1.82 and from 0.17 to 0.3, respectively.

Methocel 65–HG is comprised of from 27% to 29% by weight methoxyl substituents and from 4% to 7.5% by weight of hydroxypropoxyl substituents. The degree of substitution with methoxy and hydroxypropoxyl substituents is from 1.61 to 1.75 and from 0.1 to 0.18, respectively.

Methocel 70–HG is comprised of from 24% to 27% by weight of methoxy substituents and from 3% to 5.5% by weight of hydroxypropoxyl substituents. The degree of substitution with methoxy and hydroxypropoxyl substituents is from 1.42 to 1.61 and from 0.07 to 0.13, respectively.

Methocel 90–HG is comprised of from 19% to 24% by weight of methoxy substituents and from 4% to 12% hydroxypropoxyl substituents. The degree of substitution with methoxy and hydroxypropoxyl substituents is from 1.08 to 1.42 and from 0.1 to 0.3, respectively.

The hydroxypropoxyl-substituted methylcellulose ethers comprise from about 0.2% to about 1.5% by weight of the total hairdressing compositions of this invention. Preferably, the total amount of both thickening agents ranges from about 0.6% to about 2.0% by weight of the hairdressing composition.

It is necessary to adjust the pH of compositions of this invention to the range from about 6 to 8, preferably 6.6 to 6.85. Neutralization is effected with an unsubstituted monoamine containing from about 1 to 18 carbon atoms with not more than 6 carbon atoms in a chain uninterrupted with nitrogen atoms. Preferably, a short-chain amine such as triethylamine, isopropylamine, diisopropylamine, or morpholine is used for this purpose.

The preferred hairdressing compositions according to this invention contain as an auxiliary hair grooming agent a water-soluble, nonvolatile, hydroxy-substituted compound having a boiling point of 170° C. or higher. Examples of such compounds include glycerine, ethylene glycol, propylene glycol and alkoxy polyoxyalkylene glycols and diols. Preferred grooming agents are the water-soluble lower-alkoxy polyoxyalkylene glycols or polyoxyalkylene diols in which oxyalkylene is a mixture of oxyethylene and oxypropylene in a ratio of about 3:1 to about 1:3 and which have an average molecular weight greater than about 400 and not greater than about 5000. Lower alkoxy is intended to include alkoxy radicals ranging in carbon atom content from 1 to about 6. Polyoxyethyleneoxypropylene diols are described in U.S. Patent 2,425,845 issued to Toussaints et al. The butoxy polyoxyalkylene glycols having the oxyalkylene characteristics described above are especially preferred grooming agents in the compositions of the present invention, particularly wherein the oxyethylene and oxypropylene are in about equal parts by weight. However, other alkoxy polyoxyalkylene glycols can be used; for example methoxy, ethoxy, propoxy, pentoxy and hexoxy polyoxyethylene oxypropylene glycols, wherein the ratio of oxyethylene to oxypropylene is in the range from 3:1 to 1:3, are excellent as hair grooming agents in these compositions. The hair grooming agent should desirably comprise from about 5% to about 60% by weight of the total hairdressing composition. Although the combination of thickening agents employed in this invention provides excellent hair control properties, substantial improvement in grooming qualities is provided if at least 5% of this auxiliary hair grooming agent is employed. No more than 60% is used, in order to permit the inclusion of water and alcohol to obtain the desired gel structure.

A low molecular weight cosmetically acceptable alcohol is used with water in the solvent portions of the compositions of this invention. Ethanol is preferred over other alcohols because it does not involve the toxicity problems of methanol or the odor problems of isopropanol or the evaporation problems of the higher alcohols. Denaturants can be used; the bitter denaturants are preferred over methanol as denaturant. The compositions of this invention can contain from about 20 to about 70% by weight of the total composition of solvent, including from about 10% to about 60% of alcohol. At least about 10% of alcohol is necessary to provide a non-greasy "feel" to the hairdressing because of its tendency to reduce viscosity and surface tension. Alcohol is also useful to dissolve any perfume oils used in the hairdressing to insure a homogeneous product. Alcohol also acts to reduce any undesirable sudsing tendency of the dressing. Ethanol is also a useful constituent in the hairdressing since it evaporates rapidly after application, giving a cooling, tingling sensation to the scalp. Not more than 60% alcohol should be used in order to permit the inclusion of water, hair grooming agent and thickening agents. The balance of the composition should be water.

Various minor ingredients can be added to the composition of this invention to make it more attractive in appearance or use. Examples of such minor ingredients are: up to about 1% color (in up to about 1% solution); up to about 2% perfumes; emulsifiers; and up to about .1% of antifoaming agents such as silicone foam depressants.

An especially preferred embodiment of this invention entails the use of from about .1% to about 5% of an antidandruff agent selected from the group consisting of the zinc, cadmium, tin, and zirconium salts of 1-hydroxy-2-pyridinethione. Surprisingly, it has been found that the acute oral toxicity of hairdressing compositions containing such antidandruff agents in conjunction with the unique combination of thickening agents in accordance with this invention is markedly lower than such compositions without these thickening agents. Reduction of acute oral toxicity is extremely important in all household products because of the well-known propensity of children to ingest such products without regard to their intended use.

Both Methocel and Carbopol present desirable and undesirable qualities when used separately as thickening agents in hairdressing compositions. Taken together, however, they produce a synergistic system having qualities that enhance the performance as well as the appearance of a hairdressing product. Methocel, for example, produces a tough agglomerate film deemed undesirable by users. Carbopol forms no film by itself and somewhat "dilutes" the Methocel film to within the limits of acceptability. The film-forming ability of Methocel, modified by the Carbopol, imparts additional control of the hair not realized with Carbopol alone. Further, Carbopol alone produces a desirable standup gel while Methocel used separately thickens to a more fluid concentrate. However, a pure Carbopol gel adheres rigidly to the sides of a polyethylene tube, leaving an unsightly looking partially full tube. The Methocel reduces the rigidity of the Carbopol gel structure to allow very slow flow in the tube, but still provides the standup gel appearance.

The hairdressing compositions of this invention are illustrated by the following examples:

EXAMPLE I

A hairdressing composition was prepared having the following formulation:

| | Percent by wt. |
|---|---|
| Butoxypolyoxyethyleneoxypropylene glycol having a molecular weight of 1200 and a viscosity of 400 Saybolt Universal seconds at 100° F. wherein the oxyethylene and oxypropylene are in equal parts | 30.0 |
| Carbopol 940 [1] | 0.51 |
| Methocel 60–HG [1] | 0.75 |
| Cetyl dimethyl benzyl ammonium chloride | 0.5 |
| Ethanol | 30.0 |
| Isopropylamine (50% solution) | 0.155 |
| Perfume | 0.20 |
| Dye | .05 |
| Sunscreen | 0.10 |
| Water | Bal. | pH 6.72.

[1] As hereinbefore defined.

This product was a clear rigid standup gel packageable in a plastic tube and having a low yield strength such that when dispensed from the tube and placed on the hand the product quickly reverted to liquid. The product provided a high degree of manageability to the hair yet did not leave a sticky film on drying. The product was stable and retained its desirable physical properties during several months of storage.

In the foregoing example, Carbopol 940 can be replaced by Carbopols 934 and 941 (both as hereinbefore defined) with substantially equivalent results. Further, butoxypolyoxyethyleneoxypropylene glycol can be replaced by glycerine, ethylene glycol, propylene glycol, or mixtures thereof with good results.

As hereinbefore indicated, the thickening combination of this invention substantially reduces the acute oral toxicity of the other components of the hairdressing as can be seen from the following table.

TABLE I

| | Percent by weight | |
|---|---|---|
| | A | B |
| Butoxypolyoxyethyleneoxypropylene glycol having a molecular weight of 1200 and a viscosity of 400 Saybolt Universal seconds at 100° F. wherein the oxyethylene and oxypropylene are in equal parts | 30.0 | 30.0 |
| Carbopol 940 [1] | 0.55 | |
| Methocel 60-HG [1] | 0.75 | |
| Ethanol | 30.0 | 30.0 |
| Zinc 2-pyridinethiol-1-oxide | 0.1 | 0.1 |
| Cetyl dimethyl benzyl ammonium chloride | 0.5 | 0.5 |
| Isopropyl amine | 0.19 | 0.19 |
| Misc. (perfume, dye and sunscreen as in Example I) | 0.35 | 0.35 |
| Water | Balance | |
| pH | 6.72 | 6.72 |

[1] As hereinbefore defined.

The acute oral toxicity of compositions A and B above was tested on rats by the conventional method. The lethal dosage ($LD_{50}$) for composition A which contained the thickeners of this invention was 16.6 ml./kg. while the $LD_{50}$ for composition B (essentially the same composition, but without thickeners) was 11.3 ml./kg. It can be seen that substantially greater quantities of compositions containing the unique combination of thickeners in accordance with this invention could be accidentally ingested without adverse effect than compositions containing the same components without the thickeners. Further, composition A possesses excellent antidandruff properties as well as the desired physical and performance properties. Zinc 2-pyridinethiol-1-oxide can be replaced in whole or in part by cadmium, tin or zirconium 2-pyridinethiol-1-oxide with substantially equivalent results.

Further examples of the formulations of this invention are as follows:

| | Percent By Weight | | | | |
|---|---|---|---|---|---|
| Example | II | III | IV | V | VI |
| Component: | | | | | |
| Carbopol 934 [1] | | 0.2 | | 0.3 | |
| Carbopol 940 [1] | 0.5 | | | | 0.6 |
| Carbopol 941 [1] | | | 0.8 | | |
| Methocel 60-HG [1] | 1.5 | | | 1.3 | |
| Methocel 65-HG [1] | | 1.0 | | | |
| Methocel 90-HG [1] | | | | 0.5 | 0.8 |
| Grooming agent (1) [2] | 10 | | | | |
| Grooming agent (2) [2] | | 30 | | | |
| Grooming agent (3) [2] | | | 50 | | |
| Ethanol | 50 | 30 | 10 | 30 | 30 |
| Water | Balance | | | | |
| Isopropylamine to adjust to pH | 6.6 | 6.85 | 6.7 | 6.7 | 6.7 |

[1] As hereinbefore defined.
[2] Grooming agent (1) is the same butoxypolyoxyethyleneoxypropylene glycol as was employed in Example I. Grooming agent (2) is glycerine. Grooming agent (3) is propylene glycol.

Each of the products of the above examples is a gel having a good appearance and satisfactory hair grooming properties. Each is readily packaged in a clear plastic tube. When rubbed out on the hand prior to application to the hair and scalp these products quickly break down to a liquid. When applied to hair and after drying these products do not leave a sticky film on the hair.

The following hair grooming agents can be substituted in equal amounts for the butoxy polyoxyethyleneoxypropylene glycol in Example II with substantially equal results:

Butoxypolyoxyethyleneoxypropylene glycol having a molecular weight of 2650 and a viscosity of 2000 Saybolt Universal seconds at 100° F., wherein the oxyethylene and oxypropylene are in equal parts;

Polyoxyethyleneoxypropylene diol having a molecular weight of 990 and a viscosity of 450 Saybolt Universal seconds at 100° F., wherein the ratio of oxyethylene to oxypropylene is 3:1.

In Examples II–VI, isopropylamine can be replaced with triethylamine, diisopropylamine or morpholine in quantities sufficient to adjust to the indicated pH with substantially equivalent results.

What is claimed is:

1. A gel hairdressing composition comprising (1) from about 0.1% to about 1.0% by weight of a high molecular weight carboxyvinyl polymer, said polymer comprising polyacrylic acid cross-linked with about 1% of polyallyl sucrose having an average of about 5.8 allyl groups for each sucrose molecule; (2) from about 0.2% to about 1.5% by weight of a hydroxypropoxyl substituted methycellulose ether consisting of from about 19% to about 30% by weight of methoxy substituents and from about 3% to about 12% by weight of hydroxypropoxyl substituents; (3) from about 10% to about 60% by weight of an alcohol selected from the group consisting of methanol, ethanol and isopropanol; and (4) the balance substantially water, said composition being adjusted to a pH within the range from about 6 to 8 with an alkaline unsubstituted monoamine selected from the group consisting of triethylamine, isopropylamine, diisopropylamine, and morpholine.

2. A gel hairdressing composition comprising (1) from about 0.1% to about 1% by weight of a high molecular weight carboxyvinyl polymer, said polymer comprising polyacrylic acid cross-linked with about 1% of polyallyl sucrose having an average of about 5.8 allyl groups for each sucrose molecule; (2) from about 0.2% to about 1.5% by weight of a hydroxypropoxyl substituted methylcellulose ether consisting of from about 19% to about 30% by weight of methoxy substituents and from about 3% to about 12% by weight of hydroxypropoxyl substituents; (3) from about 5% to about 60% by weight of a water-soluble, nonvolatile hydroxy-substituted compound having a boiling point of 170° C. or higher selected from the group consisting of glycerin, ethylene glycol, propylene glycol, and lower alkoxy polyoxyalkylene glycols and diols, wherein the polyoxyalkylene is a mixture of oxyethylene and oxypropylene in a weight ratio of about 3:1 to about 1:3, the average molecular weight of said alkoxy polyoxyalkylene compound being greater than about 400 and not greater than about 5000; (4) from about 10% to about 60% ethanol; and (5) the balance substantially water, said composition being adjusted to a pH within the range from about 6 to 8 with a member selected from the group consisting of triethylamine, isopropylamine, diisopropylamine, and morpholine.

3. A gel hairdressing composition comprising (1) from about 0.5% to about 0.75% by weight of a high molecular weight carboxyvinyl polymer, said polymer comprising polyacrylic acid cross-linked with about 1% of polyallyl sucrose having an average of about 5.8 allyl groups for each sucrose molecule; (2) from about 0.2% to about 1.5% by weight of a hydroxypropoxyl substituted methylcellulose ether consisting of from about 19% to about 30% by weight of methoxy substituents and from about 3% to about 12% by weight of hydroxypropoxyl substituents; (3) from about 5% to about 60% by weight of a hair grooming agent selected from the group consisting of glycerine, ethylene glycol, propylene glycol, and water-soluble lower-alkoxy polyoxyalkylene glycols and diols wherein the polyoxyalkylene is a mixture of oxyethylene and oxypropylene in a ratio of about 3:1 to about 1:3, the average molecular weight of said alkoxypolyoxyalkylene compound being greater than about 400 and not greater than about 5000; (4) from about 10% to about 60% by weight of ethanol; (5) from about 0.1% to about 5% of an antidandruff agent selected from the group consisting of the zinc, cadimum, tin, and zirconium salts of 1-hydroxy-2-pyridinethione; and (6) the balance substantially water, said composition being adjusted to a pH within the range from about 6 to 8 with a member selected from the group consisting of triethylamine, isopropylamine, diisopropylamine and morpholine; said composition being packaged in a clear plastic tube.

4. The composition of claim 3 wherein the substituted cellulose ether consists of from 28% to 30% by weight of methoxy substituents and 7% to 12% by weight of hydroxypropoxyl substituents, the degree of substitution with said substituents being from 1.68 to 1.82 and from 0.17 to 0.3, respectively.

References Cited

UNITED STATES PATENTS

| | | | |
|---|---|---|---|
| 2,771,395 | 11/1956 | Mehaffey | 167—87 |
| 2,923,692 | 2/1960 | Ackerman et al. | 167—63 X |
| 3,061,519 | 10/1962 | Rosekrans | 167—87 |
| 3,133,865 | 5/1964 | Richardson et al. | 167—87.1 |
| 3,178,353 | 4/1965 | Scheller et al. | 167—87 |
| 3,210,251 | 10/1965 | Klug | 167—87 |

FOREIGN PATENTS 902,282  11/1944  France.

OTHER REFERENCES

Levy et al.: Drug and Cosmetic Industry, vol. 81, No. 5, pp. 606–607 and 697–698, November 1957.

ALBERT T. MEYERS, *Primary Examiner.*

V. C. CLARKE, *Assistant Examiner.*

U.S. Cl. X.R.

252—316; 260—17